(12) United States Patent
VonFeldt et al.

(10) Patent No.: US 8,422,424 B1
(45) Date of Patent: Apr. 16, 2013

(54) IDENTIFICATION OF BACKHAUL LINKS FOR TERMINATION

(75) Inventors: Brian Daniel VonFeldt, Olathe, KS (US); Sarah E. Price, Merriam, KS (US); William Leslie Hitchcock, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 719 days.

(21) Appl. No.: 12/633,195

(22) Filed: Dec. 8, 2009

(51) Int. Cl.
*H04W 4/00* (2009.01)

(52) U.S. Cl.
USPC .......................................... 370/328

(58) Field of Classification Search ............ 370/328
See application file for complete search history.

(56) References Cited

U.S. PATENT DOCUMENTS

| | | | |
|---|---|---|---|
| 7,307,961 B2 | 12/2007 | Radpour | |
| 2007/0077933 A1* | 4/2007 | El-Sayed et al. | 455/446 |
| 2008/0058975 A1* | 3/2008 | Visuri et al. | 700/100 |
| 2009/0067333 A1* | 3/2009 | Ergen et al. | 370/235 |
| 2009/0310527 A1* | 12/2009 | Rao et al. | 370/315 |
| 2011/0081865 A1* | 4/2011 | Xiao et al. | 455/63.1 |
| 2011/0110273 A1* | 5/2011 | Copeland | 370/255 |
| 2011/0131338 A1* | 6/2011 | Hu | 709/229 |

\* cited by examiner

*Primary Examiner* — Brandon Renner
*Assistant Examiner* — Faisal Choudhury

(57) ABSTRACT

A wireless communication network is served by a plurality of network paths between network control nodes and base stations, wherein the network paths each include a plurality of backhaul links. A backhaul link termination system comprises a communication interface and a processing system. The communication interface is configured to receive architecture information that individually associates the backhaul links with the network paths, and to receive communication loading data and cost data for each of the backhaul links. The processing system is configured to process the architecture information, the loading data, and the cost data to identify a set of the backhaul links for termination.

20 Claims, 6 Drawing Sheets

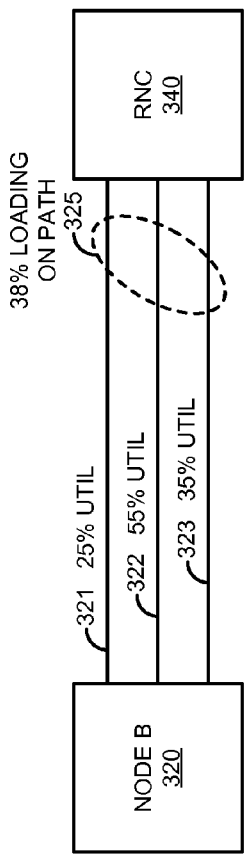 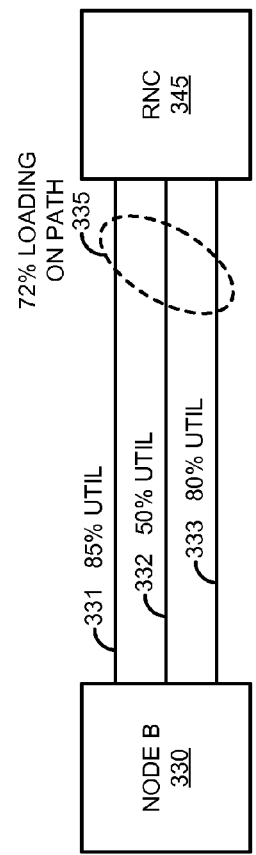

| LINK | PATH | BS | VENDOR | REGION | MARKET | LINK UTILIZATION | CONTRACT START DATE | PRICING PLAN | DISCONNECT RECOMMENDATION |
|---|---|---|---|---|---|---|---|---|---|
| 321 | 325 | 320 | QWEST | WEST | ABQ | 25% | 04/08/2008 | 3 YEAR | DISCONNECT APPROVED |
| 322 | 325 | 320 | QWEST | WEST | ABQ | 55% | 04/08/2008 | 3 YEAR | DISCONNECT DENIED |
| 323 | 325 | 320 | QWEST | WEST | ABQ | 35% | 04/08/2008 | 3 YEAR | DISCON APPROVED 12/08/2009 |
| 331 | 335 | 330 | BELL | SOUTH | ATL | 85% | 09/15/2009 | 5 YEAR | DISCONNECT DENIED |
| 332 | 335 | 330 | BELL | SOUTH | ATL | 50% | 09/15/2009 | 5 YEAR | DISCONNECT DENIED |
| 333 | 335 | 330 | BELL | SOUTH | ATL | 80% | 09/15/2009 | 5 YEAR | DISCONNECT DENIED |

FIGURE 6

IDENTIFICATION OF BACKHAUL LINKS FOR TERMINATION

TECHNICAL BACKGROUND

A wireless communication device and its serving base station communicate wirelessly to provide voice, Internet, email, text, video, and other communication services. The serving base station has a backhaul communication link with a communication service provider. When the base station provides a communication service to a wireless communication device, content requested by the device is first sent to the base station over the backhaul link. Once the base station has received the requested data, the base station transmits the data to the wireless communication device.

The communication service provider typically leases the backhaul links from backhaul providers like Local Exchange Carriers (LECs) or coaxial cable companies. Typical backhaul lease terms include a 1, 3, or 5 year pricing plan, monthly recurring costs, and penalties for early termination. As demand for wireless communication service shifts, the communication service provider may desire to remove underutilized backhaul links from the network. However, the service provider must consider the penalties incurred for prematurely terminating a backhaul link lease. In the past, service provider personnel have performed manual calculation steps using complicated tariff documents to determine whether terminating a specific link would result in a lower contractual cost than maintaining it unnecessarily. Unfortunately, these steps are time consuming, requiring manual tracking and tedious decision making points which often result in suboptimal disconnects.

OVERVIEW

A method of operating a backhaul link termination system is described herein, wherein a wireless communication network is served by a plurality of network paths between network control nodes and base stations and wherein the network paths each include a plurality of backhaul links. The method of operating the backhaul link termination system comprises receiving architecture information that individually associates the backhaul links with the network paths, receiving communication loading data and cost data for each of the backhaul links, and processing the architecture information, the loading data, and the cost data to identify a set of the backhaul links for termination.

A wireless communication network is served by a plurality of network paths between network control nodes and base stations, wherein the network paths each include a plurality of backhaul links. A backhaul link termination system comprises a communication interface and a processing system. The communication interface is configured to receive architecture information that individually associates the backhaul links with the network paths, and to receive communication loading data and cost data for each of the backhaul links. The processing system is configured to process the architecture information, the loading data, and the cost data to identify a set of the backhaul links for termination.

A method of operating a backhaul link termination system is described herein, wherein a wireless communication network is served by a plurality of network paths between network control nodes and base stations and wherein the network paths each include a plurality of backhaul links. The method of operating the backhaul link termination system comprises receiving architecture information that individually associates the backhaul links with the network paths, receiving communication loading data and cost data for each of the backhaul links, wherein the loading data comprises an optimal loading level for each of the network paths and an indication of whether each of the backhaul links is overloaded or under loaded based on threshold values, and wherein the cost data comprises a plurality of contract provisions associated with a plurality of contracts for leasing the backhaul links from a plurality of backhaul providers, and processing the architecture information, the loading data, and the cost data to identify a set of the backhaul links for termination by identifying ones of the backhaul links that cost less to terminate than to maintain through a lease time period and by identifying ones of the backhaul links that can be terminated without overloading remaining ones of the backhaul links in the associated network path.

BRIEF DESCRIPTION OF THE DRAWINGS

FIG. 4 is a block diagram that illustrates a network path.

FIG. 5 is a block diagram that illustrates a network path.

FIG. 6 illustrates a termination report in an exemplary embodiment.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
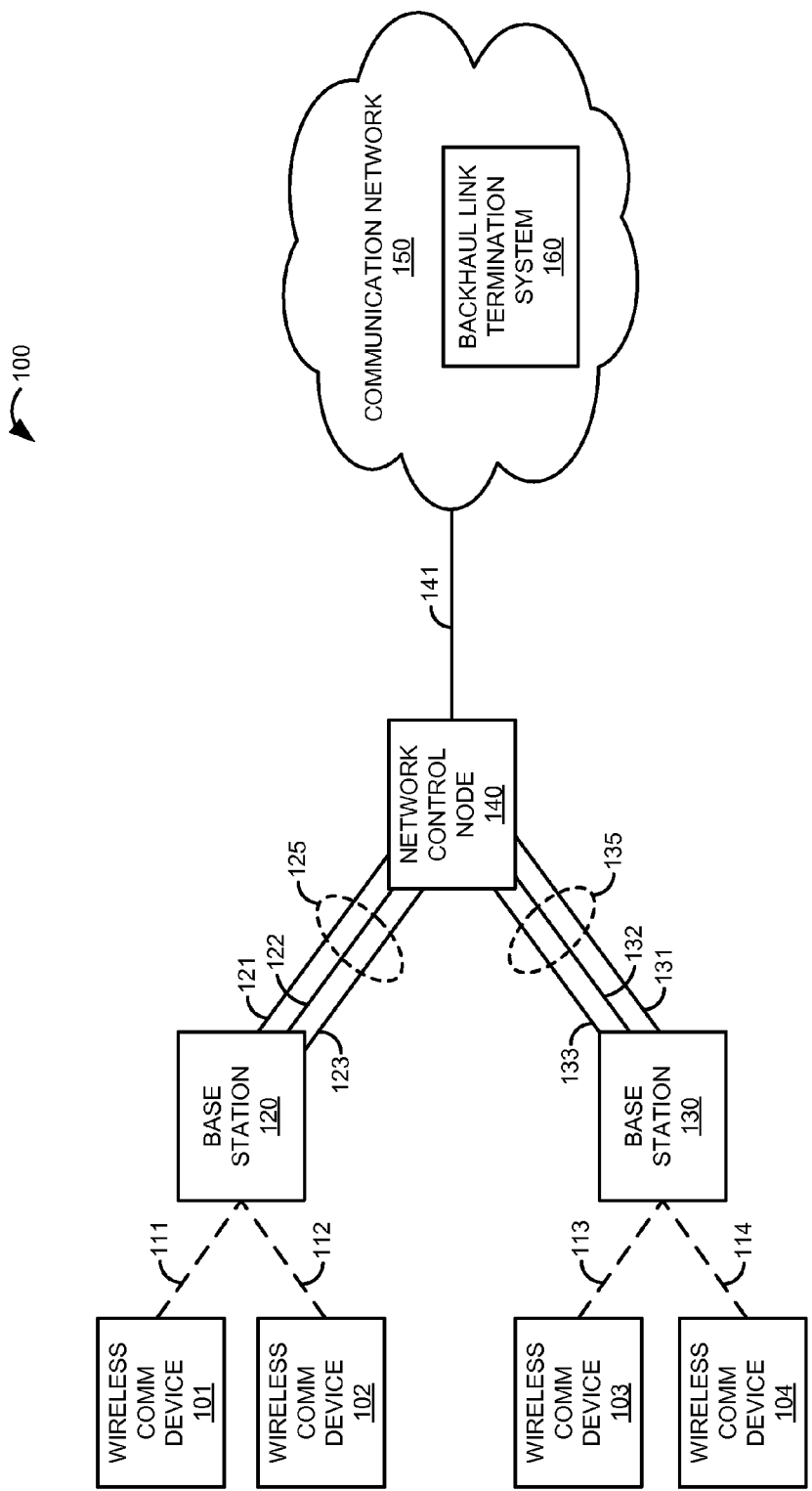
FIG. 1 is a block diagram that illustrates a communication environment.

FIG. 1 is a block diagram that illustrates communication environment 100. Communication environment 100 includes wireless communication devices 101-104, base stations 120 and 130, network control node 140, and communication network 150. Communication network 150 includes backhaul link termination system 160. Wireless communication devices 101 and 102 communicate with base station 120 over respective wireless communication links 111 and 112. Likewise, wireless communication devices 103 and 104 communicate with base station 130 over respective wireless communication links 113 and 114. Base station 120 is in communication with network control node 140 over network path 125. Network path 125 comprises backhaul links 121, 122, and 123. Likewise, base station 130 is in communication with network control node 140 over network path 135. Network path 135 comprises backhaul links 131, 132, and 133. Network control node 140 communicates with communication network 150 over communication link 141.

Figure 2:
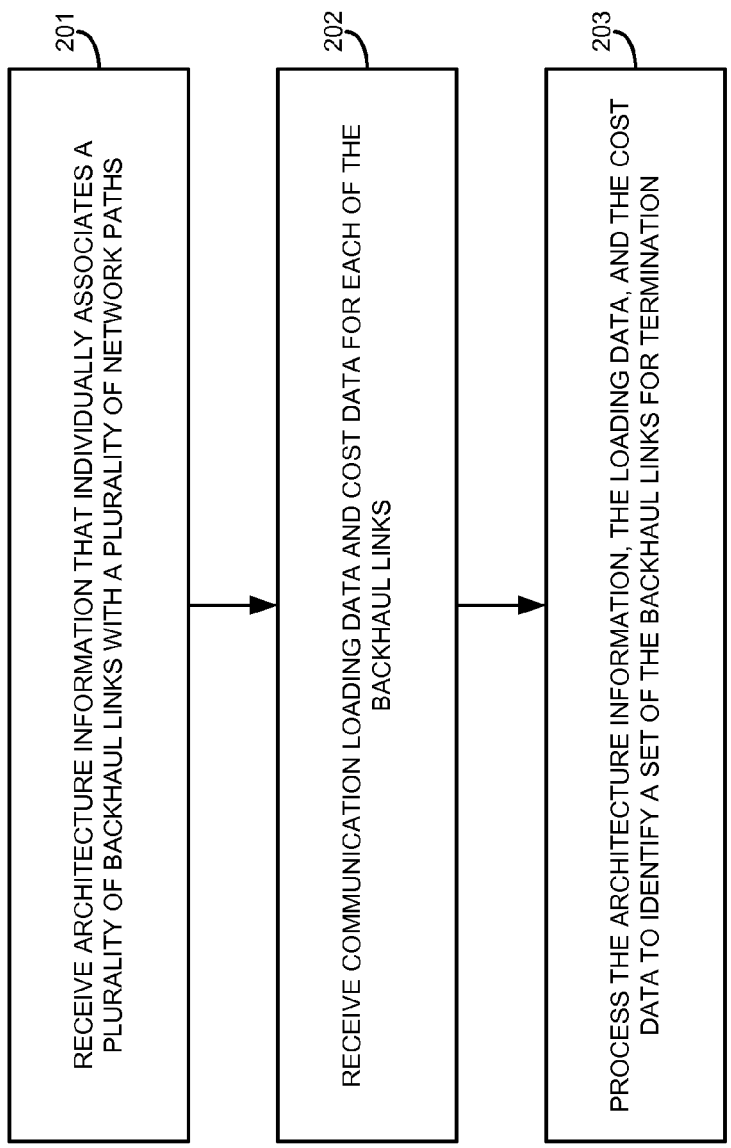
FIG. 2 is a flow diagram that illustrates an operation of the communication environment.

FIG. 2 is a flow diagram that illustrates an operation of communication environment 100. The steps of the operation are indicated below parenthetically. The operation of FIG. 2 may be performed in a wireless communication network served by a plurality of network paths 125 and 135 between network control node 140 and base stations 120 and 130, wherein the network paths 125 and 135 each include a plurality of respective backhaul links 121-123 and 131-133. In FIG. 2, backhaul link termination system 160 receives architecture information that individually associates the backhaul links 121-123 and 131-133 with the network paths 125 and 135 (201). As shown in FIG. 1, the architecture information individually associates backhaul links 121-123 with network path 125 and backhaul links 131-133 with network path 135. Backhaul link termination system 160 may receive the architecture information in a variety of ways, such as by accessing a database, receiving input from a user, or polling elements on or in communication with the network paths 125 and 135, for example.

In addition to the architecture information, backhaul link termination system 160 receives communication loading data and cost data for each of the backhaul links 121-123 and 131-133 (202). The communication loading data comprises information about the bandwidth utilization on backhaul links 121-123 and 131-133. In some examples, the communication loading data could comprise an indication of whether each of the backhaul links is overloaded or under loaded based on threshold values. The communication loading data could also comprise an optimal loading level or threshold for each of the network paths 125 and 135, or a maximum loading level for each of the backhaul links 121-123 and 131-133.

The cost data comprises a plurality of contract provisions associated with a plurality of contracts for leasing the backhaul links 121-123 and 131-133 from a plurality of backhaul providers. A backhaul provider could include, for example, a Local Exchange Carrier (LEC), coaxial cable provider, or fiber optic link provider. In some examples, the cost data comprises financial information and lease terms associated with contracts for the lease of the backhaul links 121-123 and 131-133, such as contractual volume commitments. The cost data could comprise a contractual termination liability for each of the backhaul links 121-123 and 131-133, wherein the contractual termination liability comprises a cost of breaching a lease contract at a specified time. The cost data could also comprise a monthly recurring cost for each of the backhaul links 121-123 and 131-133. In some examples, the cost data could be recalculated dynamically based on contractual stipulations and tariffs input by a user of backhaul link termination system 160.

Once backhaul link termination system 160 receives the above information, backhaul link termination system 160 processes the architecture information, the loading data, and the cost data to identify a set of the backhaul links 121-123 and 131-133 for termination (203). The set of backhaul links 121-123 and 131-133 for termination could include, for example, links with low utilization and minimal termination liability. In some examples, backhaul link termination system 160 identifies ones of the backhaul links 121-123 and 131-133 that cost less to terminate than to maintain through a lease time period. In other examples, backhaul link termination system 160 could favor a particular backhaul provider or backhaul link type when identifying the set of the backhaul links 121-123 and 131-133 for termination.

Additionally or alternatively, backhaul link termination system 160 could identify ones of the backhaul links 121-123 and 131-133 that can be terminated without overloading remaining ones of the backhaul links in the associated network path 125 or 135. This identification could be achieved by determining whether the overall loading on the network path 125 or 135 would exceed a threshold value if a particular backhaul link 121-123 or 131-133 were terminated. The threshold value could be based on an optimal loading level for each of the network paths 125 and 135, which typically ranges from fifty to eighty percent, for example.

In some examples, the loading data comprises a growth factor related to an estimated bandwidth requirement at a future time for each of the backhaul links 121-123 and 131-133. Backhaul link termination system 160 could process the growth factor to estimate future bandwidth requirements when identifying the set of the backhaul links 121-123 and 131-133 for termination. In this manner, a backhaul link 121-123 and 131-133 that would otherwise be recommended for termination may be preserved if backhaul link termination system 160 determines that the bandwidth provided by the link will be needed at the future time based on the growth factor.

Advantageously, backhaul link termination system 160 can automatically identify an optimal set of backhaul links 121-123 and 131-133 for termination without requesting any manual calculations or decisions. In addition, backhaul link termination system 160 may generate a termination report indicating the identified set of the backhaul links for termination. The termination report could indicate, for each of the backhaul links, a recommendation for termination, a recommendation for non-termination, or a recommendation for termination at a future date. The termination report could also rank the backhaul links 121-123 and 131-133 in order of termination liability and loading level. By referring to the termination report, an operator of communication network 150 can quickly identify the optimal links for termination based on underutilization and the lowest early-termination penalties.

Referring back to FIG. 1, wireless communication devices 101-104 each comprise any device having wireless communication connectivity with hardware and circuitry programmed to function as a telecommunications device, including Radio Frequency (RF) communication circuitry and an antenna. The RF communication circuitry typically includes an amplifier, filter, modulator, and signal processing circuitry. Wireless communication devices 101-104 may also include a user interface, memory device, software, processing circuitry, or some other communication components. For example, wireless communication devices 101-104 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication devices 101-104 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Internet, telephony, or any other wireless network protocol that facilitates communication between wireless communication devices 101-104 and base stations 120 and 130.

Base stations 120 and 130 comprise RF communication circuitry and an antenna. The RF communication circuitry typically includes an amplifier, filter, RF modulator, and signal processing circuitry. Base stations 120 and 130 may also comprise a router, server, memory device, software, processing circuitry, cabling, power supply, network communication interface, structural support, or some other communication apparatus. Base stations 120 and 130 could comprise a wireless access node, Internet access node, telephony service node, wireless data access point, or some other wireless communication system—including combinations thereof. Some examples of base stations 120 and 130 include a base transceiver station (BTS), base station controller (BSC), radio base station (RBS), Node B, enhanced Node B (eNode B), and others. Wireless network protocols that may be utilized by base stations 120 and 130 include CDMA, GSM, UMTS, HSPA, EV-DO, EV-DO rev. A, 3GPP LTE, WiMAX, Wi-Fi, Internet, telephony, or some other communication format—including combinations thereof.

Network control node 140 comprises equipment to monitor and control the operations of base stations 120 and 130, including coordinating handoffs of wireless communication devices 101-104. Network control node 140 also includes equipment to route communications between base stations 120 and 130 and communication network 150. In some examples, network control node 140 could comprise a radio network controller (RNC), base station controller (BSC), mobile switching center (MSC), media gateway controller (MGC), authentication, authorization and accounting (AAA) server, call processing system, access service network gateway (ASN-GW), application server, router, processing system, or some other equipment—including combinations thereof.

Communication network 150 comprises the core network of a wireless communication provider, and could include routers, gateways, telecommunication switches, servers, processing systems, or other communication equipment and systems for providing communication and data services. Communication network 150 could comprise wireless communication nodes, telephony switches, Internet routers, network gateways, computer systems, communication links, or some other type of communication equipment—including combinations thereof. Communication network 150 may also comprise optical networks, asynchronous transfer mode (ATM) networks, packet networks, metropolitan-area networks (MAN), or other network topologies, equipment, or systems—including combinations thereof. Communication network 150 may be configured to communicate over metallic, wireless, or optical links. Communication network 150 may be configured to use time-division multiplexing (TDM), Internet Protocol (IP), Ethernet, optical networking, wireless protocols, communication signaling, or some other communication format—including combinations thereof. In some examples, communication network 150 includes further access nodes and associated equipment for providing communication services to many wireless communication devices across a large geographic region.

Backhaul link termination system 160 comprises a computer system and communication interface. Backhaul link termination system 160 may also include other components such as a router, server, data storage system, and power supply. Backhaul link termination system 160 may reside in a single device or may be distributed across multiple devices. Backhaul link termination system 160 may be a discrete system or may be integrated within other systems—including other systems within communication environment 100. Backhaul link termination system 160 could comprise a packet gateway, mobile switching center, network gateway system, Internet access node, application server, service node, firewall, or some other communication system—including combinations thereof.

Wireless communication links 111-114 use the air or space as the transport medium. Wireless communication links 111-114 may use various protocols, such as CDMA, GSM, UMTS, HSPA, EV-DO, EV-DO rev. A, 3GPP LTE, WiMAX, Wi-Fi, Internet, telephony, or some other communication format—including combinations thereof. Wireless communication links 111-114 may transfer many different signals sharing the same link. For example, wireless communication links 111-114 could include multiple signals operating in a single propagation path comprising multiple communication sessions, frequencies, timeslots, transportation ports, logical transportation links, network sockets, IP sockets, packets, or communication directions—including combinations thereof.

Communication links 121-123, 131-133, and 141 use metal, air, space, optical fiber such as glass or plastic, or some other material as the transport media—including combinations thereof. Communication links 121-123, 131-133, and 141 could use various communication protocols, such as TDM, IP, Ethernet, telephony, optical networking, hybrid fiber coax (HFC), communication signaling, wireless protocols, or some other communication format—including combinations thereof. Communication links 121-123, 131-133, and 141 could be direct links or may include intermediate networks, systems, or devices.

Network paths 125 and 135 each include a plurality of respective backhaul links 121-123 and 131-133. Each backhaul link 121-123 on network path 125 provides a communication link between base station 120 and network control node 140. Likewise, backhaul links 131-133 on network path 135 provide separate communication links between base station 130 and network control node 140. In some examples, the total communication loading on network path 125 or 135 comprises the sum of the loading on the individual links 121-123 or 131-133 for each respective path 125 or 135.

Figure 3:
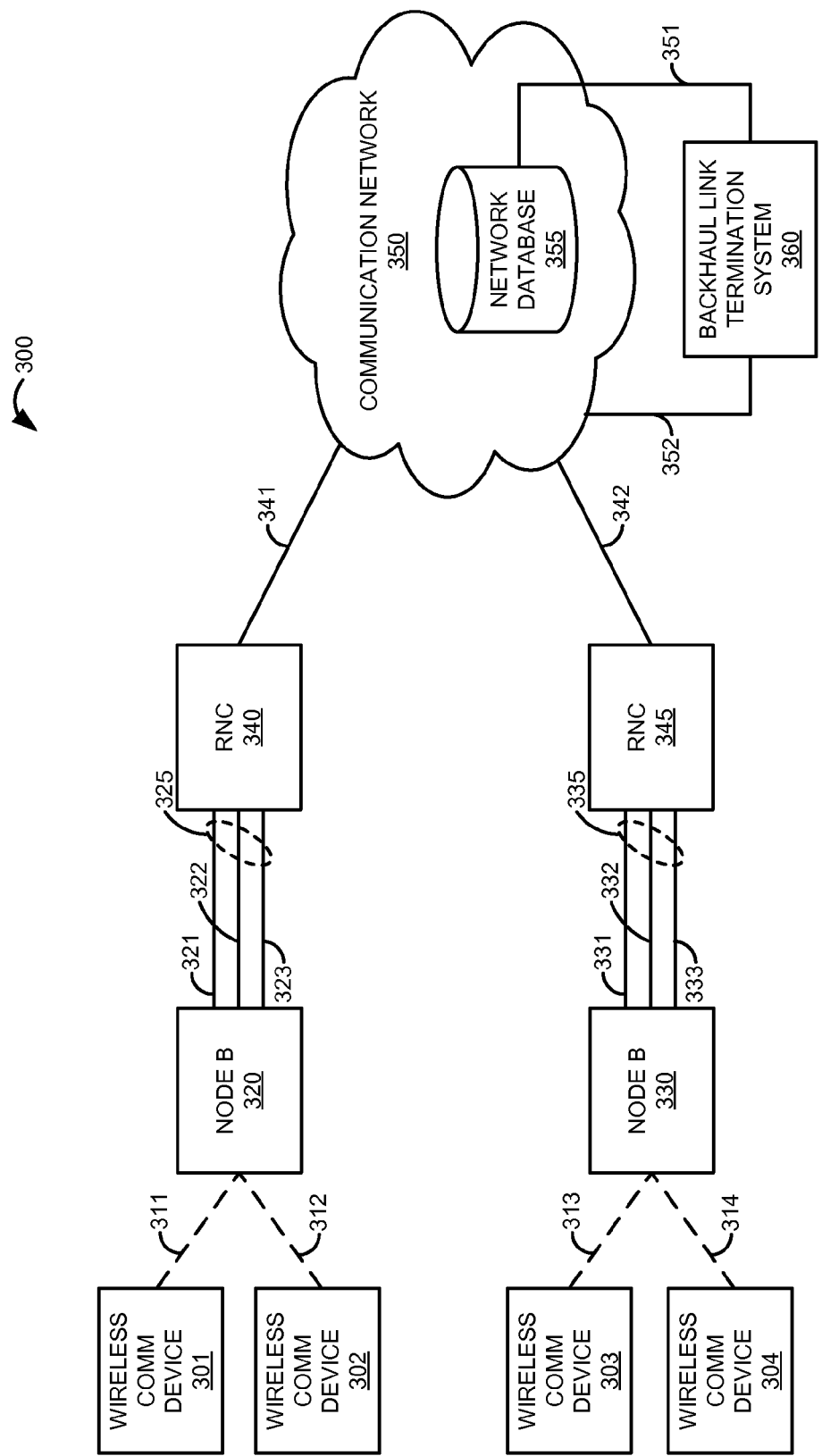
FIG. 3 is a block diagram that illustrates a communication environment in an exemplary embodiment.

FIG. 3 is a block diagram that illustrates communication environment 300 in an exemplary embodiment. Communication environment 300 utilizes Universal Mobile Telecommunications System (UMTS) third generation (3G) wireless communication technology. Communication environment 300 includes wireless communication devices 301-304, Node B base stations 320 and 330, Radio Network Controllers (RNCs) 340 and 345, communication network 350, and backhaul link termination system 360. Wireless communication devices 301 and 302 communicate with Node B 320 over respective wireless communication links 311 and 312. Likewise, wireless communication devices 303 and 304 communicate with Node B 330 over respective wireless communication links 313 and 314. Node B 320 is in communication with RNC 340 over communication path 325. Communication path 325 comprises backhaul links 321, 322, and 323. Likewise, Node B 330 is in communication with RNC 345 over communication path 335. Communication path 335 comprises backhaul links 331, 332, and 333. RNCs 340 and 345 communicate with communication network 350 over respective communication links 341 and 342. Communication network 350 includes network database 355. Network database 355 is in communication with backhaul link termination system 360 over communication link 351. Backhaul link termination system 360 communicates with communication network 350 over communication link 352. While backhaul link termination system 360 is shown external to communication network 350, system 360 could be included within communication network 350 or other elements shown in communication environment 300. Note that while the exemplary embodiment of FIG. 3 describes a wireless communication environment, the principles discussed herein could equally apply to wired networks.

FIG. 4 is a block diagram that illustrates network path 325 between Node B 320 and RNC 340. The utilization of each of the backhaul links 321-323 that together form network path 325 is shown in FIG. 4, along with the total communication loading on network path 325. In FIG. 4, the utilization of each of the backhaul links 321-323 represents the amount of bandwidth being consumed by voice or data transmissions over the links at the present time. Thus, backhaul link 321 is operating at 25% utilization, backhaul link 322 has 55% utilization, and backhaul link 323 has 35% utilization. Assuming each backhaul link 321-323 provides the same amount of bandwidth, the total loading on network path 325 is 38% communication loading, as shown in FIG. 4. Since optimal loading levels typically range from 50-80%, network path 325 is relatively underutilized at 38% loading. It should be noted that although this example assumes each backhaul link 321-323 has the same capacity, any combination of backhaul links could be included in a network path, regardless of the bandwidth, service provider, or other attributes of the links.

FIG. 5 is a block diagram that illustrates network path 335 between Node B 330 and RNC 345. The utilization of each of the backhaul links 331-333 that together form network path 335 is shown in FIG. 5, along with the total communication loading on network path 335. As shown, backhaul link 331 is operating at 85% utilization, backhaul link 332 has 50% utilization, and backhaul link 333 has 80% utilization. Assuming each backhaul link 331-333 provides the same amount of bandwidth, network path 335 is operating at 72% communication loading, as shown in FIG. 5. Since optimal loading levels typically range from 50-80%, network path 335 is optimally loaded and may soon approach over-utilization if it experiences further growth in the future.

FIG. 6 illustrates termination report 601 in an exemplary embodiment. Termination report 601 is generated by backhaul link termination system 360 and provides a recommendation for each of the backhaul links 321-323 and 331-333 of communication environment 300. Termination report 601 is presented in tabular form with each column showing a different metric related to the backhaul links 321-323 and 331-333. Note that termination report 601 is provided as an illustrative example and thus other termination reports could include greater or fewer columns of related information or be presented in an entirely different format.

The first row of termination report 601 indicates each of the backhaul links in the 'LINK' column, followed by the 'PATH', 'BS', 'VENDOR', 'REGION', 'MARKET', 'LINK UTILIZATION', 'CONTRACT START DATE', 'PRICING PLAN', and 'DISCONNECT APPROVAL STATUS'. The 'PATH' and 'BS' columns indicate the network path 325 or 335 and the Node B base station 320 or 330 associated with each of the respective backhaul links 321-323 and 331-333. The 'VENDOR' column lists the various backhaul providers for each of the backhaul links 321-323 and 331-333, while the 'REGION' and 'MARKET' columns indicate the general and specific geographical areas where the backhaul links 321-323 and 331-333 are in service. The 'LINK UTILIZATION' column designates the loading level on each of the backhaul links 321-323 and 331-333 expressed as a percentage of the total available bandwidth on each of the links. The 'CONTRACT START DATE' and "PRICING PLAN' columns relate to the lease terms associated with each of the backhaul links 321-323 and 331-333, where the 'PRICING PLAN' indicates the duration of the lease contract. Finally, 'DISCONNECT RECOMMENDATION' identifies whether disconnection of a particular backhaul link 321-323 and 331-333 is approved, denied, or approved at a future date. In some examples, the approval, denial, and future approval indications are colored coded green, red, and yellow for easier identification, and may be sorted by recommendation type.

As shown in termination report 601, backhaul link termination system 360 recommends backhaul link 321 for immediate termination, as indicated by the 'DISCONNECT APPROVED' status for link 321, and recommends backhaul link 323 for termination on Dec. 8, 2009. Backhaul link termination system 360 could arrive at this recommendation by processing the architecture information, loading data, and cost data received from network database 355, which could be entered into database 355 by communication service provider personnel as new backhaul links are installed or leased. In some examples, the communication service provider personnel can review the architecture information, loading data, and cost data. Upon review of the data, the personnel are presented with an option to approve, reject, or mark the data for further analysis or data collection, and may provide a reason code to explain their selection. Rejected backhaul links or network paths are triaged based on the reason code provided, while accepted network paths are processed by backhaul link termination system 360 to determine a recommended action.

To determine the recommended action, backhaul link termination system 360 first determines which network paths 325 and 335 are operating below the optimal loading level according to threshold values. In one example, the optimal loading level threshold for each network path 325 and 335 is provided in the loading data, and backhaul link termination system 360 calculates the total loading on each network path 325 and 335 from the architecture information and the loading data. To perform this calculation, backhaul link termination system 360 first determines from the architecture information the specific backhaul links 321-323 and 331-333 comprising the network paths 325 and 335, respectively. Once the backhaul links 321-323 and 331-333 are associated with their respective network paths 325 and 335, backhaul link termination system 360 calculates the loading on the entire network path 325 and 335 based on the link utilization of each of the links 321-323 and 331-333 on each path 325 and 335 as provided in the loading data. Alternatively, the total loading level on each network path 325 and 335 may be predetermined and provided in the loading data along with the optimal loading level for each network path 325 and 335.

When the optimal loading level and the total loading for each network path 325 and 335 are known, backhaul link termination system 360 determines the network paths 325 and 335 operating below the optimal loading level by comparing the optimal loading level to the total loading on each network path 325 and 335. For the purpose of clarity, the optimal loading level for each network path 325 and 335 in this example is 80%, although the optimal levels for each path could be different values or ranges. As shown in FIGS. 4 and 5, network path 325 is operating at a suboptimal 38% loading, while the 72% loading on network path 335 is nearing the optimal loading level of 80%. Thus, links 321-323 of network path 325 are identified as appropriate for a disconnect approval recommendation based on underutilization, provided that the contractual volume commitment of at least one of the backhaul links 321-323 allows for a financially viable early termination.

The contractual volume commitment for each link 321-323 and 331-333 in network paths 325 and 335 is based on monthly recurring cost and termination liability, where the termination liability is defined as the cost to immediately terminate a backhaul link. Backhaul link termination system 360 determines the contractual volume commitment for each backhaul link 321-323 and 331-333 by combining the monthly recurring cost and the termination liability for all links in each network path 325 and 335 and comparing the two-year recurring cost to the one-time disconnect cost. The backhaul links 321-323 and 331-333 with the lowest financial impact are identified for termination. If all financial impacts are the same, then the most recently installed link is identified for termination to avoid additional labor costs in rearranging the entire network path. Backhaul link termination system 360 then generates termination report 601 and indicates which of the backhaul links 321-323 and 331-333 are recommended for termination.

As shown in termination report 601, backhaul links 321 and 323 are recommended for termination, as indicated by 'DISCONNECT APPROVED' disconnect recommendation. In particular, backhaul link 321 is recommended for immediate termination, likely because link 321 has the lowest utilization at 25% and the contractual volume commitment of link 321 results in the lowest financial impact for immediate termination. In addition, shifting the 25% utilization of link 321 onto the remaining links 322 and 323 results in 58% loading on network path 325, lower than the 80% optimal level while still allowing room for future growth.

However, backhaul link 323 is not approved for immediate termination, but is instead recommended for termination at a future date of Dec. 8, 2009. Backhaul link termination system 360 provides a recommended termination date at a future time when immediate termination would result in a high financial impact or excessive communication loading shifted to remaining backhaul links in a network path. For example, in termination report 601, link 323 is not recommended for immediate termination along with link 321 because network path 325 would then solely comprise backhaul link 322 and be overloaded at 115% utilization. However, backhaul link termination system 360 recommends disconnection of link 323 on Dec. 8, 2009, one year and eight months after the contract start date of Apr. 8, 2008. This may be due to certain contract provisions that reduce the financial impact of termination on that date, or may be due to other considerations, such as a growth factor.

The growth factor could comprise a projected reduction in communication loading on link 323 or the associated network path 325, or a projected increase in the bandwidth available on network path 325. For example, backhaul link termination system 360 may detect a trend of declining link utilization for link 323 or across the total loading of network path 325. In another example, backhaul link termination system 360 may process the architecture information to determine that new or planned backhaul link installations in the proximity of backhaul link 323 are projected to shift a large amount of the communication loading away from link 323 and path 325. In another example, new or planned installations of backhaul links on network path 325 will increase the available bandwidth on the path, allowing for earlier termination of older links 321-323 if their lease terms permit such action with low financial impact.

Regarding network path 335, all backhaul links 331-333 on path 335 are not recommended for termination at the present time or in the future, as indicated by the 'DISCONNECT DENIED' disconnect recommendation. Based on an 80% optimal loading level, backhaul link 331 is overloaded at 85%, backhaul link 332 is 50% loaded, and backhaul link 333 is optimally loaded at 80%. However, disconnecting any of these links 331-333 would result in overloading the entire network path 335. In addition, the contractual volume commitment for each of the backhaul links 331-333 in path 335 likely has a large financial impact for early termination due to the contract start dates and pricing plan. The contract start date for each of the links 331-333 of network path 335 indicates that the leases were recently executed, resulting in a large remainder of the contract term requiring payment through the lease time period under the 5 year pricing plan. Thus, due to the high communication loading on links 331-333 and the costly financial impact for early termination of leases with substantial remaining time under the pricing plan, backhaul link termination system 360 has denied termination of links 331-333 in the 'DISCONNECT RECOMMENDATION' column of termination report 601.

In some examples, backhaul link disconnect recommendations are reviewed based on an automated list of approval and denial templates for a vendor, region, or market. The automated list of approval and denial templates is input and maintained by communication service provider personnel. However, the automation is based on prior approval or denial in cases where no contractual volume commitment exists or the loading level for a particular LEC or network path is already optimal or not in question. Backhaul links or network paths with no prior approval or denial history or that are marked for manual review are presented to service provider personnel for manual approval/denial from a contractual standpoint. In some examples, an automated approval/denial recommendation is marked for manual review after a threshold period of time has elapsed.

Figure 7:
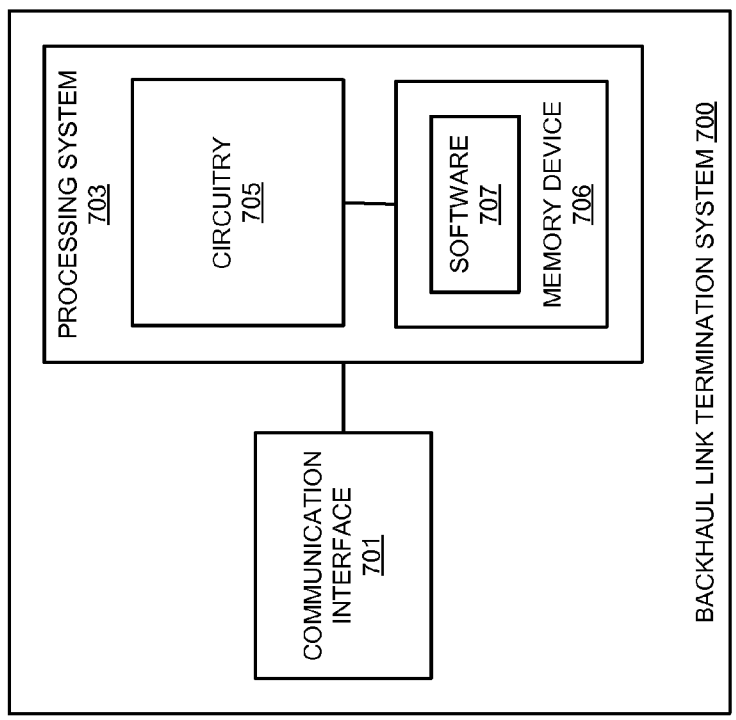
FIG. 7 is a block diagram that illustrates a backhaul link termination system.

FIG. 7 is a block diagram that illustrates backhaul link termination system 700. Backhaul link termination system 700 provides an example of backhaul link termination system 160, although system 160 may use alternative configurations. Backhaul link termination system 700 comprises communication interface 701 and processing system 703. Processing system 703 is linked to communication interface 701. Processing system 703 includes processing circuitry 705 and memory device 706 that stores operating software 707.

Communication interface 701 comprises components that communicate over communication links, such as network cards, ports, RF transceivers, processing circuitry and software, or some other communication components. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof. Communication interface 701 is capable of receiving architecture information that individually associates a plurality of backhaul links with a plurality of network paths, and capable of receiving communication loading data and cost data for each of the backhaul links.

Processing circuitry 705 comprises microprocessor and other circuitry that retrieves and executes operating software 707 from memory device 706. Memory device 706 comprises a disk drive, flash drive, data storage circuitry, or some other memory apparatus. Operating software 707 comprises computer programs, firmware, or some other form of machine-readable processing instructions. Operating software 707 may include an operating system, utilities, drivers, network interfaces, applications, or some other type of software. When executed by circuitry 705, operating software 707 directs processing system 703 to operate backhaul link termination system 700 as described herein. In particular, operating software 707 directs processing system 703 to process architecture information, loading data, and cost data to identify a set of backhaul links for termination.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a backhaul link termination system, wherein a wireless communication network is served by a plurality of network paths between network control nodes and base stations and wherein the network paths each include a plurality of backhaul links, the method comprising:
   receiving architecture information that individually associates the backhaul links with the network paths;
   receiving communication loading data and cost data for each of the backhaul links, wherein the loading data comprises the optimal loading level for each of the network paths and an indication of whether each of the backhaul links is overloaded or under loaded based on threshold values; and
   processing the architecture information, the loading data, and the cost data to identify a set of the backhaul links for termination, wherein processing the cost data comprises identifying ones of the backhaul links that cost less to terminate than to maintain through a lease time period and by identifying the backhaul links that can be terminated without overloading the remaining backhaul links in the associated network path.

2. The method of claim 1 wherein identifying the backhaul links that cost less to terminate than to maintain comprises identifying the backhaul links that cost less to terminate than to maintain through a lease time period.

3. The method of claim 1 wherein identifying the set of backhaul links for termination comprises identifying ones of the backhaul links that can be terminated without overloading remaining ones of the backhaul links in the associated network path.

4. The method of claim 1 wherein the loading data comprises a growth factor related to an estimated bandwidth requirement at a future time for each of the backhaul links.

5. The method of claim 1 wherein the loading data comprises an optimal loading level for each of the network paths.

6. The method of claim 1 wherein the loading data comprises an indication of whether each of the backhaul links is overloaded or under loaded based on threshold values.

7. The method of claim 1 wherein the cost data comprises a plurality of contract provisions associated with a plurality of contracts for leasing the backhaul links from a plurality of backhaul providers.

8. The method of claim 7 further comprising generating a termination report indicating the set of the backhaul links for termination.

9. The method of claim 8 wherein the termination report indicates, for each of the backhaul links, a recommendation for termination, a recommendation for non-termination, or a recommendation for termination at a future date.

10. The method of claim 9 wherein the termination report indicates an unpaid contractual liability for each of the backhaul links recommended for termination, wherein the unpaid contractual liability indicates a remaining cost under each of the contracts through a lease time period.

11. A backhaul link termination system, wherein a wireless communication network is served by a plurality of network paths between network control nodes and base stations and wherein the network paths each include a plurality of backhaul links, the system comprising:
   a communication interface configured to receive architecture information that individually associates the backhaul links with the network paths, and receive communication loading data and cost data for each of the backhaul links, wherein the loading data comprises the optimal loading level for each of the network paths and an indication of whether each of the backhaul links is overloaded or under loaded based on threshold values; and
   a processing system configured to process the architecture information, the loading data, and the cost data to identify a set of the backhaul links for termination, wherein processing the cost data comprises identifying ones of the backhaul links that cost less to terminate than to maintain through a lease period and by identifying the backhaul links that can be terminated without overloading the remaining backhaul links in the associated network path.

12. The system of claim 11 wherein the processing system is configured to identify ones of the backhaul links that cost less to terminate than to maintain through a lease time period.

13. The system of claim 11 wherein the processing system is configured to identify the backhaul links that can be terminated without overloading remaining ones of the backhaul links in the associated network path.

14. The system of claim 11 wherein the loading data comprises a growth factor related to an estimated bandwidth requirement at a future time for each of the backhaul links.

15. The system of claim 11 wherein the loading data comprises an optimal loading level for each of the network paths.

16. The system of claim 11 wherein the loading data comprises an indication of whether each of the backhaul links is overloaded or under loaded based on threshold values.

17. The system of claim 11 wherein the cost data comprises a plurality of contract provisions associated with a plurality of contracts for leasing the backhaul links from a plurality of backhaul providers.

18. The system of claim 11 further comprising the processing system configured to generate a termination report indicating the set of the backhaul links for termination.

19. The system of claim 18 wherein the termination report indicates, for each of the backhaul links, a recommendation for termination, a recommendation for non-termination, or a recommendation for termination at a future date.

20. A method of operating a backhaul link termination system, wherein a wireless communication network is served by a plurality of network paths between network control nodes and base stations and wherein the network paths each include a plurality of backhaul links, the method comprising:
   receiving architecture information that individually associates the backhaul links with the network paths;
   receiving communication loading data and cost data for each of the backhaul links, wherein the loading data comprises an optimal loading level for each of the network paths and an indication of whether each of the backhaul links is overloaded or under loaded based on threshold values, and wherein the cost data comprises a plurality of contract provisions associated with a plurality of contracts for leasing the backhaul links from a plurality of backhaul providers; and
   processing the architecture information, the loading data, and the cost data to identify a set of the backhaul links for termination by identifying ones of the backhaul links that cost less to terminate than to maintain through a lease time period and by identifying ones of the backhaul links that can be terminated without overloading remaining ones of the backhaul links in the associated network path.

* * * * *